Figure 1:
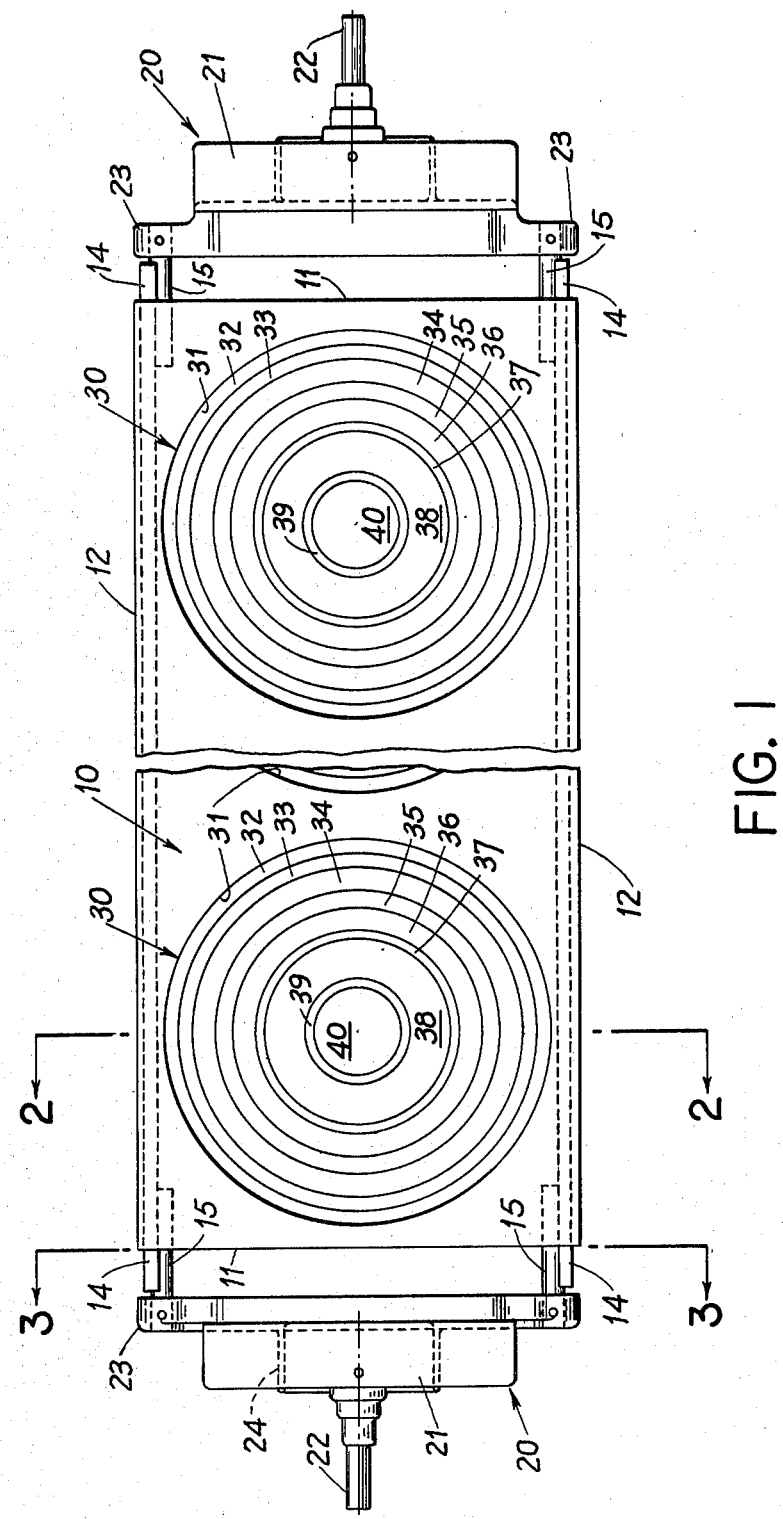

United States Patent [19]

Seiling

[11] 4,398,880
[45] Aug. 16, 1983

[54] PROOFER TRAY ASSEMBLY HAVING STEPPED RELEASE COATING RETAINING SURFACES

[75] Inventor: Samuel O. Seiling, Richmond, Va.

[73] Assignee: AMF Incorporated, White Plains, N.Y.

[21] Appl. No.: 346,989

[22] Filed: Feb. 8, 1982

[51] Int. Cl.³ ............................ A21C 7/04; A21C 9/08
[52] U.S. Cl. ................................. 425/439; 198/646; 220/72; 249/120; 249/135; 249/137; 425/99; 425/439
[58] Field of Search ....................... 425/193, 36 R, 326, 425/446, 439, 92, 90; 99/353, 426, 427, 483; 198/646, 655, 645; 249/117, 135, 137, 120; 229/2.5 R; 220/72

[56] References Cited

U.S. PATENT DOCUMENTS

| | | | |
|---|---|---|---|
| 2,750,899 | 6/1956 | Marasso | 425/193 |
| 2,942,301 | 6/1960 | Price et al. | 229/2.5 R |
| 3,695,424 | 10/1972 | Cristy et al. | 229/2.5 R |
| 3,857,477 | 12/1974 | Chipchase | 198/646 |

*Primary Examiner*—Willard E. Hoag
*Attorney, Agent, or Firm*—David E. Dougherty; Charles J. Worth

[57] ABSTRACT

A proofer tray assembly with a circular cup having a stepped configuration providing a series of substantially horizontal annular surfaces forming ledges for retaining a dough release agent such as sifted flour or sprayed oil.

7 Claims, 3 Drawing Figures

PROOFER TRAY ASSEMBLY HAVING STEPPED RELEASE COATING RETAINING SURFACES

This invention relates generally to overhead proofers and more particularly to trays therefor.

After scaling and rounding by dough make-up apparatus, the rounded dough pieces have undergone substantial stresses and have lost much of their gas and pliability. Also, the surfaces of the dough pieces do not have a formed skin and are tacky. An overhead or intermediate proofer is disposed between the dough make-up apparatus and a molder-panner and provides the dough with a predetermined rest period. Proofing permits the dough pieces to withstand further stresses of forming without having their skins torn and also permits regaining part of their lost aeration or gasification.

Up to the present time, dough pieces have been deposited by the dough make-up apparatus into generally spherical pockets or cups of trays of a proofer. The trays are carried by chains, endless conveyors or the like and are overturned at a predetermined point of travel to deposit or dump the dough pieces at the molder-panner. To prevent the dough pieces from sticking, a release agent such as flour is sifted, or oil is sprayed on the inner surfaces of the cups. However, the flour or oil tends to drop to the bottom of a spherical cup and is additionally urged in that direction by a wiping action when a dough piece is dropped into the cup.

Accordingly, an object of the present invention is to provide a substantially sanitary proofer tray with pockets or cups, having a construction which facilitates cleansing.

Another object of the present invention is to provide the foregoing tray with cups or pockets having surfaces particularly positioned to retain a release agent, such as flour or oil and, thereby, prevent dough pieces from sticking to the pockets or cups when the trays are dumped.

And another object of the present invention is to provide the foregoing tray in which each circular cup or pocket has a stepped interior surface providing a plurality of concentric substantially horizontal annular surfaces for holding the flour sifted or oil sprayed into the cup as a release agent.

The foregoing and other objects and advantages will appear more fully hereinafter from a consideration of the detailed description which follows, taken together with the accompanying drawings wherein a single embodiment of the invention is illustrated by way of example. It is to be expressly understood, however, that the drawings are for illustration purposes only and are not to be construed as defining the limits of the invention.

FIG. 1 is a plan view, with the center portion removed, of a tray made in accordance with the present invention.

Figure 2:
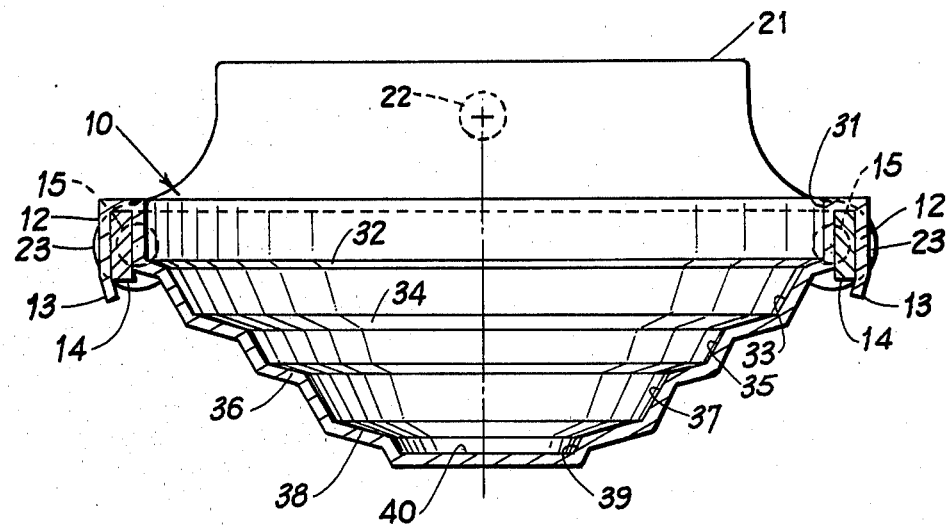
Figure 3:
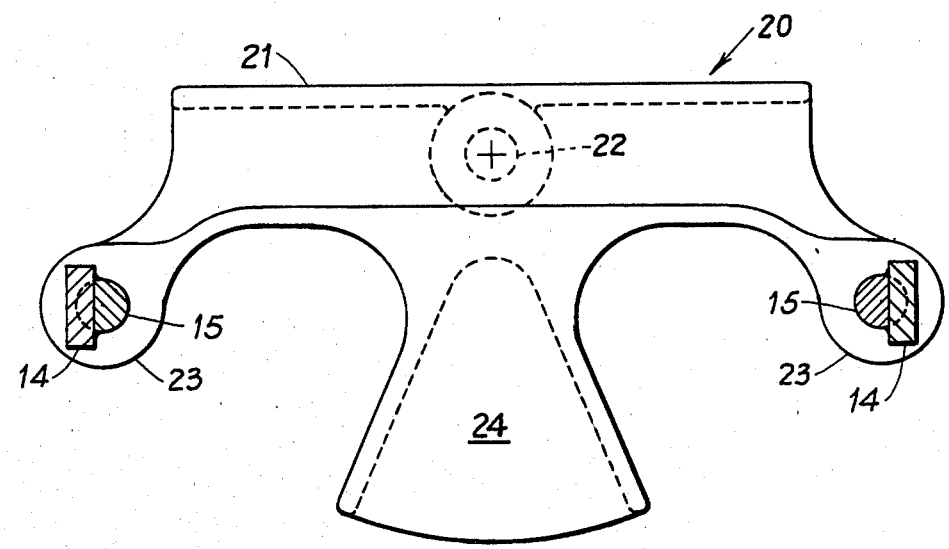

FIGS. 2 and 3 are enlarged sectional views on line 2—2, and 3—3, respectively of FIG. 1.

Referring now to the drawings, a proofer tray 10 made in accordance with the present invention is provided with a planar surface having a plurality of integral pockets or cups 30 depending therefrom and appropriately spaced along the centerline of the planar surface between the tray ends 11. The cups 30 are circular or cylindrical when viewed from the top, as defined by their upper vertical wall portions 31 forming lips at the cup openings and are of a stepped configuration, best shown in FIG. 2, as will be further discussed. The front and rear edges of the tray 10 are provided with downwardly extending flanges 12 each terminating with a lip portion 13 which extends downwardly and inwardly of the flange.

A pair of support rods 14 are disposed beneath the front and rear portions of the planar surface of the tray 10 each being positioned between the vertical walls or wall portions 31 of cups 30 and one of the flanges 12, as best shown in FIG. 2, and retained in position by the appropriate lip 13. The flanges 12 may be displaced outwardly without permanent deformation for removal of the trays 10. Each of the ends of the rods 14 is provided with a pin 15 which extends beyond one of the ends 11 of the tray 10. The rods 14 and pins 15 may be suitably recessed and welded together or may be obtained by forging.

A bracket 20 similar to that shown in U.S. Pat. No. 2,755,913 to F. D. Marasso is provided at each end of the tray 10 with a body portion 21 having a central mounting or pivot pin 22 and a spaced pair of depending legs 23 which receive and are connected to the pins 15 of the rods 14 as best shown in FIGS. 1 and 3. The pivot pins 22 are axially aligned with each other and are disposed above the centerline of the planar surface providing a pivotal axis transverse to the direction of movement of the tray 10. One or both of the brackets 20 are provided with a centrally disposed depending leg or cam 24 which engages a fixed abutment of the proofer as shown in U.S. Pat. No. 2,750,899 to F. D. Marasso at a predetermined point of travel causing the assembly of the tray 10 and brackets 20 to rotate on mounting pins 22 thereby resulting in an overturning movement to dump or drop dough pieces out of the pockets or cups 30.

Referring particularly to FIG. 2, each of the cups 30 is provided with a vertical flange or wall portion 31 connected by a stepped wall or configuration to a planar horizontal cup base or bottom 40 generally providing ring portions substantially parallel to the planar surface forming ledges for retaining a release agent. The stepped configuration more specifically provides an alternating series of substantially horizontal and substantially vertical annular wall or ring portions 32 . . . 39. Preferably, the substantially horizontal annular wall or ring portions 32, 34, 36 and 38 are slightly sloped downwardly toward their inner edges while the substantially vertical wall portions 33, 35, 37 and 39 are each wider at the top than at the bottom thus appearing to be almost frusta-conical or truncated conical sections. The slight slope or inward inclination of the wall portions 32, 34, 36 and 38 does not appreciably impair or reduce their capability of retaining the flour or oil release agent, and is more than offset by the generally conical vertical wall portions 33, 35, 37 and 39 which have a limited capability of retaining a release agent, and the obtuse angles or angles greater than 90° formed between adjacent wall portions.

Cups 30 may be made as separate inserts which are snapped into sockets of the planar surface, however an integral tray 10 with the pockets or cups 30 will eliminate any joints which could become contaminated and/or difficult to clean. Trays 10 may be made of any suitable plastic material approved by the F.D.A. which is impervious to dough or components thereof which is preferably of a rigid nature, such as ABS or Lexon, or of a stainless steel.

Although, but a single embodiment of the invention has been illustrated and described in detail, it is to be expressly understood that the invention is not limited thereto. Various changes may be made in the design and arrangement of the parts without departing from the spirit and scope of the invention as the same will now be understood by those skilled in the art.

What is claimed is:

1. A tray assembly for use with a proofer wherein the tray assembly includes a support mechanism having two spaced rods and a pivotal axis disposed transverse to the direction of movement of a proofer conveyor comprising:
   a tray carried by the rods with its planar surface normally disposed in a horizontal position; and
   at least one dough holding cup whose side wall extends downwardly from said planar surface between said rods,
   the cup sidewall having a stepped configuration with a plurality of ring sections arranged generally parallel to the planar surface of the tray to form ledges for retaining a dough release agent which facilitates the dropping of the dough from the cup when the tray support mechanism is pivoted.

2. The tray assembly of claim 1 wherein said ring sections are sloped slightly toward a central axis of said cup.

3. The tray assembly of claim 1 wherein said ring sections have substantially planar and parallel surfaces, the plane of each of said surfaces intersecting a central axis of said cup substantially at a right angle.

4. A tray assembly according to claim 1 wherein the cup wall is formed integrally with the planar surface of the tray.

5. A tray assembly according to claim 1 wherein the spaced rods are positioned beneath the planar surface adjacent two opposed edges of the tray, each of said edges having a dependent flange extending downwardly past the corresponding rod.

6. A tray assembly according to claim 5 wherein the lower end of each flange is provided with an inwardly disposed lip which extends beneath the corresponding rod thereby locking the tray to the support mechanism.

7. A tray assembly according to claim 6 wherein the flanges are arranged and proportioned so that the lips can be bent outwardly to clear the rods and release the tray without permanent deformation of the tray.

* * * * *